(12) United States Patent
Yamada et al.

(10) Patent No.: US 7,422,838 B1
(45) Date of Patent: Sep. 9, 2008

(54) PHASE-CHANGE OPTICAL RECORDING MEDIUM

(75) Inventors: Katsuyuki Yamada, Shizuoka (JP); Yuki Nakamura, Kanagawa (JP); Tatsuo Mikami, Kanagawa (JP); Eiji Noda, Kanagawa (JP); Kayo Katoh, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/569,501

(22) Filed: May 11, 2000

(30) Foreign Application Priority Data

Jun. 1, 1999 (JP) ................................. 11-153486

(51) Int. Cl.
G11B 7/24 (2006.01)

(52) U.S. Cl. ................ 430/270.13; 430/945; 369/275.5; 369/275.2; 428/64.5; 428/64.6

(58) Field of Classification Search ............ 430/276.13, 430/945; 369/275.2, 275.5; 428/64.5, 646
See application file for complete search history.

(56) References Cited

U.S. PATENT DOCUMENTS

| | | | | |
|---|---|---|---|---|
| 3,530,441 | A | | 9/1970 | Ovshinsky .................. 430/945 |
| 5,298,305 | A | * | 3/1994 | Shinozuka et al. .......... 428/64.6 |
| 5,498,507 | A | | 3/1996 | Handa et al. ................. 430/945 |
| 5,523,140 | A | * | 6/1996 | Tominaga et al. ........... 428/64.1 |
| 5,637,372 | A | | 6/1997 | Tominaga et al. ...... 430/270.13 |
| 5,674,649 | A | * | 10/1997 | Yoshioka et al. .............. 430/19 |
| 5,736,657 | A | * | 4/1998 | Ide et al. ................ 430/270.13 |
| 5,785,828 | A | * | 7/1998 | Yamada et al. .......... 204/298.13 |
| 5,818,808 | A | * | 10/1998 | Takada et al. ................ 369/116 |
| 5,848,043 | A | | 12/1998 | Takada et al. |
| 5,974,025 | A | | 10/1999 | Yamada et al. ............... 430/945 |
| 6,004,646 | A | * | 12/1999 | Ohno et al. .................. 430/945 |
| 6,040,066 | A | | 3/2000 | Zhou et al. |
| 6,096,398 | A | * | 8/2000 | Yuzurihara et al. ...... 430/270.13 |
| 6,132,932 | A | * | 10/2000 | Miyamoto et al. ...... 430/270.13 |
| 6,169,722 | B1 | * | 1/2001 | Kikukawa et al. ....... 430/270.13 |
| 6,537,721 | B2 | * | 3/2003 | Inoue et al. .................. 430/269 |

FOREIGN PATENT DOCUMENTS

| | | |
|---|---|---|
| DE | 19612823 | 10/1996 |
| EP | 0898272 A | 2/1999 |
| EP | 898272 A2 | 2/1999 |
| EP | 1058249 * | 12/2000 |
| JP | 60177446 | 9/1985 |
| JP | 61219692 | 9/1986 |
| JP | 6219490 | 1/1987 |
| JP | 6273438 | 4/1987 |
| JP | 63228433 | 9/1988 |
| JP | 63251290 | 10/1988 |
| JP | 1277338 | 11/1989 |
| JP | 61270190 | 7/1990 |
| JP | 4-52188 | 2/1992 |
| JP | 4-52189 | 2/1992 |
| JP | 4-78031 | 3/1992 |
| JP | 4123551 | 4/1992 |
| JP | 4163839 | 6/1992 |
| JP | 4-360039 | 12/1992 |
| JP | 09-016961 * | 1/1997 |
| JP | 11-115313 | 4/1999 |
| JP | 2000-339751 * | 12/2000 |
| WO | WO 9930317 | 6/1999 |

OTHER PUBLICATIONS

T. Handa, et al., Japanese Journal of Applied Physics, vol. 32, (1993), pp. 5226-5229.

H. Iwasaki, et al., Japanese Journal of Applied Physics, vol. 31, (1992), pp. 461-465.

H. Iwasaki, et al., Japanese Journal of Applied Physics, vol. 32, (1993), pp. 5241-5247.

Furuya, et al. Proceedings of the 4th Symposium on phase-change optical recording, (1992), pp. 70-75.

Jinno et al., Proceedings of the 4th Symposium on phase-change optical recording, (1992), pp. 76-81.

Kawanishi et al., Proceedings of the 4th Symposium on phase-change optical recording, (1992), pp. 82-86.

Maita et al., Proceedings of the 5th Symposium on phase-change optical recording, (1993), pp. 9-14.

Tominaga, et al., Proceedings of the 5th Symposium on phase-change optical recording, (1993), pp. 5-8.

Ide, et al., Proceedings of the 3th Symposium on phase-change optical recording, (1991), pp. 102-108.

Jul. 29, 2004 Japanese official action (with English Translation) in connection with corresponding Japanese Patent Application No. 11-153486.

(Continued)

Primary Examiner—Martin J Angebranndt
(74) Attorney, Agent, or Firm—Cooper & Dunham LLP

(57) ABSTRACT

A phase-change optical recording medium is disclosed including a supporting substrate and the following contiguous layers formed on the supporting substrate in the order recited such as a first dielectric layer, a recording layer, a second dielectric layer, a metal/alloy layer, and an ultraviolet light curing resinous layer. The recording layer is characterized by its uppermost recrystallization linear velocity ranging from about 5.0 m/sec to about 10.0 m/sec, which can be utilized in read/write/erase operations for the recording medium at linear velocities higher than the quad-speed as well.

29 Claims, 2 Drawing Sheets

OTHER PUBLICATIONS

Sep. 22, 2000 official Communication and European Search Report in connection with European Patent Appl. No. 00 11 2056.

T. Nishida et al., "Single-Beam Overwrite Experiment Using In-Se Based Phase-Change Optical Media", Applied Physics Letters, Mar. 16, 1987, vol. 50, No. 11, pp. 667-669.

European Patent Office, Communication Pursuant to Article 96(2) EPC dated Nov. 20, 2007, in Application No. 00 112 056.7-1232 (Ricoh).

* cited by examiner

PHASE-CHANGE OPTICAL RECORDING MEDIUM

BACKGROUND

1. Field

This patent specification relates to an optical recording medium, and more particularly to a phase-change recording medium including a recording material capable of causing the phase changes by irradiating light beam to the material, thereby recording, reproducing and rewriting information data with improved characteristics and signal durability in repeated operations, which is utilized in optical memory devices such as, in particular, rewritable compact disks.

2. Discussion of the Background

Optical recording media have recently come into wide use as a viable information data storage and archival device of large capacity.

Of the optical disk storage devices, a phase-change type recording medium is capable of implementing repeated read/write/erase operations by means of laser beam irradiation utilizing the phase transition between amorphous and crystalline states. For this type of the media in particular, overwrite operations can be carried out using a single light beam with a simpler optical readout system, which can be utilized in, for example, rewritable compact disks (or CD-RWs). Phase-change type devices are advantageous over magneto-optical type memories which have difficulties in overwriting.

The phase-change recording medium has been attracting much attention recently for its capabilities described above. It has been disclosed in U.S. Pat. No. 3,530,441 to provide chalcogenide alloys for forming recording materials such as Ge—Te, Ge—Te—Sn, Ge—Te—S, Ge—Se—S, Ge—Se—Sb, Ge—As—Se, In—Te, Se—Te and SeAs.

Also disclosed to improve stability and crystallization speed are Ge—Te alloy materials added with Au (Japanese Laid-Open Patent Application No. 61-219692), with Sn and Au (Japanese Laid-Open Patent Application No. 61-270190), or with Pd (Japanese Laid-Open Patent Application No. 62-19490). Further disclosed to improve write/readout repeated operation characteristics are Ge—Te—Se—Sb and Ge—Te—Sb alloys with specified compositions (Japanese Laid-Open Patent Applications Nos. 62-73438 and 63-228433). These alloy materials, however, have not proven satisfactory in achieving various desirable characteristics of the rewritable phase-change optical recording medium.

In particular, there are problems of great importance yet to be solved to thereby achieve desirable characteristics for attaining sufficient sensitivity during either writing or erasing operation, preventing the decrease in erasure ratio caused by leftover portions during overwriting steps, and improving the durability of the media properties of either written or non-written portions in the recording medium.

Another recording medium is proposed in Japanese Laid-Open Patent Application No. 63-251290, including a single recording layer with a crystallized state of substantially more than ternary composition. By "substantially more than ternary" is meant in the disclosure that the alloy system includes at least 90 atomic % of a ternary compound (e.g., $In_3SbTe_2$) in the recording layer. It is also stated in the disclosure that write/erasure characteristics are improved with the alloy composition. However, this composition still has shortcomings such as erasure ratio of relatively small magnitude and laser power yet to be reduced for write/erase operations.

In addition, still another recording medium is proposed in Japanese Laid-Open Patent Application No. 1-277338, including $(Sba\ Te_1-a)_{1-y}M_y$ with $0.4 \leq a \leq 0.7$ and $y \leq 0.2$, where M includes at least one additive which is selected from the group consisting Ag, Al, As, Au, Bi, Cu, Ga, Ge, In, Pb, Pt, Se, Si, Sn and Zn.

This alloy system is essentially composed of $Sb_2Te_3$ and several medium characteristics have been improved such as, high speed write/erase cycle operations by including a rather excess amount of Sb, and high speed erasure by the added M element. In addition, it is also stated that the erasing ratio is obtained to be relatively large for light beams in the continuous (or DC) mode. However, no description is found in that disclosure with respect to the erasing ratio for overwrite operations and that recording sensitivity is not satisfactory. In this context, it may be noted that leftover portions have been found by the present inventors during erasing experiments on this alloy system.

In a similar manner, further recording media are proposed including respective recording layers, in which the one recording layer includes $(In_{1-x}Sb_x)_{1-y}M_y$ with $0.55 \leq x \leq 0.80$ and $0 \leq y \leq 0.20$, as disclosed in Japanese Laid-Open Patent Application No. 60-177446, where M includes at least one which is selected from the group consisting Au, Ag, Cu, Pd, Pt, Al, Si, Ge, Ga, Sn, Te, Se and Bi; the other recording layer includes an alloy GeTe—$Sb_2Te_3$—Sb(excess), as disclosed in Japanese Laid-Open Patent Application No. 63-228433. However, this recording media composed of these alloy systems have not attained sufficient media characteristics such as the recording sensitivity and erasing ratio.

Further, there are disclosed optical recording media provided with respective recording layers including alloy systems such as, a Ge—Te—Sb alloy added with N, described in Japanese Laid-Open Patent Application No. 4-163839; a Te—Ge—Se alloy formed such that at least one of constituent elements thereof is incorporated as a nitride, described in Japanese Laid-Open Patent Application No. 4-52188; and a Te—Ge—Se alloy adsorbed with N, described in Japanese Laid-Open Patent Application No. 4-52189. The optical recording media composed of these alloy systems, however, have not acquired satisfactory characteristics for the recording media.

In spite of numerous alloy materials for forming recording layers of the optical recording media, as described hereinabove, there persist needs to solve several problems of great importance and to thereby accomplish desirable media characteristics such as sufficient sensitivity during either writing or erasing operations by preventing the decrease in erasure ratio caused by leftover portions during overwrite steps, also improving durability of the structure and property of either written or non-written portions in the recording medium.

As for the optical media, compact disks (CDs) have come into wide use as viable information storage media. Along with the rapid growth of the CDs, another type of compact disk, which are writable only once, or CD-R's, have been developed and recently placed into the market. However, since information data on the CD-R disk cannot be corrected because of its write-once feature mentioned above, the CD-R disk has a shortcoming, in that the disk has to be abandoned when even one non-correctable error is inputted during the writing steps. Another type of storage medium has therefore been awaited for, that is capable of obviating the above disadvantage of the CD-R disk.

As an example of the storage media, there may be cited a rewritable compact disk utilizing magneto-optical materials. The magneto-optical disk, however, has drawbacks such as difficulty in overwriting and being incompatible with CD-ROM and CD-R disks. Therefore, a phase-change type recording medium has been actively developed recently toward practical use as one which features disk characteristics favorable to, among others, compatibility with the above media.

The research and development results disclosed so far on the rewritable phase-change recording media and compact disks incorporating the recording media are exemplified by Furuya, et al., Proceedings of the 4th Symposium on phase change optical recording (1992) 70; Kanno, et al., Proceedings of the 4th Symposium on phase change optical recording (1992) 76; Kawanishi, et al., Proceedings of the 4th Symposium on phase change optical recording (1992) 82; T. Handa, et al., Japanese Journal of Applied Physics, Vol. 32 (1993); Yoneda, et al., Proceedings of the 5th Symposium on phase change optical recording (1993) 9; and Tominaga, et al., Proceedings of the 5th Symposium on phase change optical recording (1993) 5.

These rewritable phase-change recording media, however, have not satisfied overall characteristics, such as the compatibility with CD-ROMs and CD-Rs, write/erase capability, recording sensitivity, repeatability of rewriting and readout operations, and stability during storage. The above noted shortcomings in the media characteristics are considered primarily due to relatively low erasure ratios which are caused by the composition and/or structure of the recording materials previously employed for forming the phase-change recording media.

Accordingly, it is desirable to develop novel recording materials capable of attaining higher erasure ratios and being suitable for more sensitive write/erase operations, to thereby be able to implement phase-change compact disks having improved rewritable capabilities. In order to find improved material systems and thereby solve the above noted shortcomings, the present inventors have previously proposed several AgInSbTe recording materials. These materials are disclosed in Japanese Laid-Open Patent Applications Nos. 4-78031 and 4-123551, and also described by H. Iwasaki, et al., Japanese Journal of Applied Physics, Vol. 31 (1992) 461; Ide, et al., Proceedings of the 3rd Symposium on phase change optical recording (1991) 102; and H. Iwasaki, et al., Japanese Journal of Applied Physics, Vol. 32 (1993) 5241. In addition, as a book of standards for the rewritable disk, Part III of Orange Book (Version 2.0) was published in 1998.

While Part III of the Book defines recording (or writing) steps on CD-RW disks with 1×/2×/4× linear speeds, it takes rather a long time for recording with such low velocities. Therefore, rewritable CD disks with higher recording velocities are desirable. In this context, it may be noted that CD disk characteristics at the lower recording velocities have been disclosed by the present inventor in U.S. Pat. No. 5,974,025, for example.

In addition, since the CD-RW disks are more expensive and less ease in use than CD-R disks, it is also desirable to overcome these drawbacks, to thereby be manufactured at lower costs. Further, it is also desirable to observe the recent trend to be more benign to the environment by conserving resources and energies in producing and using the recording disks.

As described above, by utilizing the AgInSbTe recording materials disclosed by the present inventors, CD-RW disks with 1×/2×/4× linear recording speeds have been known to be feasible having excellent disk characteristics. However, further improvements are desired to implement CD-RW disks with higher recording speeds.

SUMMARY

Accordingly, it is an object of the present disclosure to provide a rewritable CD-RW disk, having most, if not all, of the advantages and features of similar employed optical recording disks, while eliminating many of the aforementioned disadvantages.

The following brief description is a synopsis of only selected features and attributes of the present disclosure. A more complete description thereof is found below in the section entitled "Description of the Preferred Embodiments"

A phase-change optical recording medium disclosed herein includes a supporting substrate, and the following contiguous layers formed on the supporting substrate in the order recited, such as a first dielectric layer, a recording layer, a second dielectric layer, a metal/alloy layer, and an ultraviolet light curing resinous layer, in which the recording layer is characterized by having an uppermost recrystallization linear velocity ranging from about 5.0 m/sec to about 10.0 m/sec.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
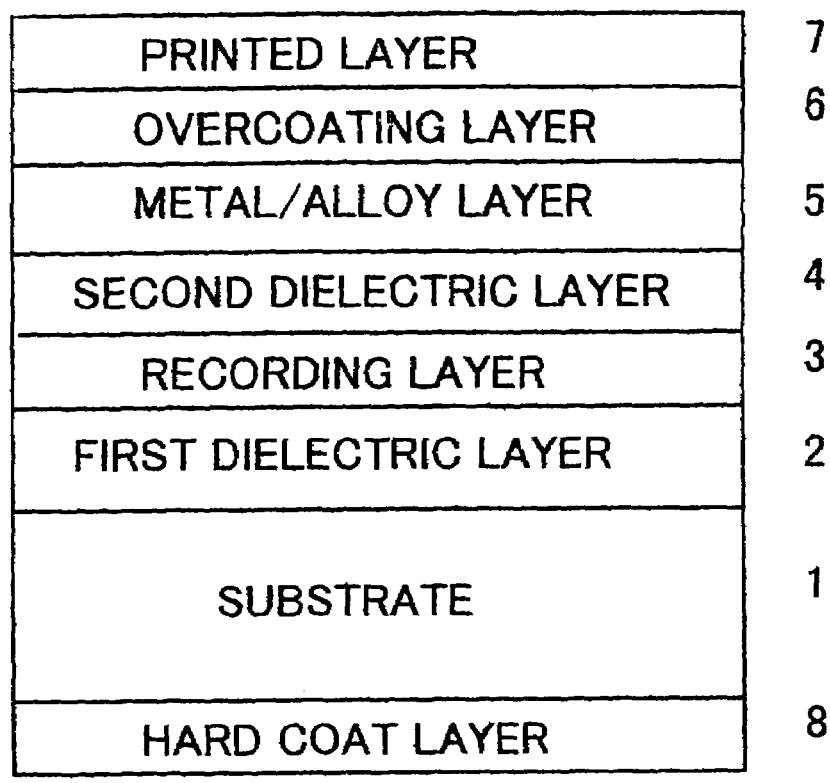
FIG. 1 is a cross sectional view illustrating a phase-change optical recording medium according to one embodiment disclosed herein.

Referring now to the drawings, there is illustrated a phase-change optical recording medium disclosed herein, including a supporting substrate 1, and the following layers formed contiguously on the supporting substrate in the order recited, such as a first dielectric layer 2, a recording layer 3, a second dielectric layer 4, a metal/alloy layer 5, and an overcoat layer 6. Further, a printed layer 7 and a hard coat layer 8 may be formed on the overcoat layer 6 and the mirror face of the substrate, respectively.

Suitable materials for use in the substrate 1 include glass, ceramics and resinous materials. Of these materials, resins can be employed for their satisfactory moldability and low costs. Specific examples of the resins include polycarbonate resins, acrylic resins, epoxy resins, polystyrene resins, acrylonitrile-styrene copolymeric resins, polyethylene resins, polypropylene resins, silicone resins, fluororesins, acrylonitrile-butadiene-styrene (ABS) resins and urethane resins. Among these resins, polycarbonate resins and acrylic resins can be used for their excellent moldability, optical properties and relatively low costs.

While the substrate 1 is usually disc-shaped, it may also be card- or sheet-shaped. The thickness of the substrate 1 is generally about 1.2 mm or 0.6 mm, but is not limited thereto. For use in the rewritable CD-RW disks utilizing phase-change recording materials, as disclosed herein, the substrate may be provided with grooves to help guide the laser beams during write/readout, and the width of the grooves is from 0.25 µm to 0.65 µm, more preferably from 0.30 µm to 0.60 µm; the depth thereof is from 150 Å to 550 Å, more preferably from 200 Å to 450 Å.

According to the present disclosure, a recording disk provided with a recording medium having linear recording velocities higher than the quad(CD4×)-speed can be formed. This may be achieved such that both amorphization from melt and crystallization from the amorphous state of the recording layer be successfully carried out in a specified or well-balanced manner at the quad-speed. Further, this may be achieved by providing a recording medium capable of being crystallized at a higher velocity than that for the previous recording medium with lower linear velocity, and, in turn, by attaining the uppermost recrystallization linear velocity ranging from 5.0 meters/sec and 10.0 meters/sec.

The above-mentioned uppermost recrystallization linear velocity is a parameter which has been devised by the present inventors to characterize the phase-change optical recording medium, and which is based upon their findings that the uppermost recrystallization linear velocity can be controlled effectively by the magnitude of the linear recording velocity.

The uppermost recrystallization linear velocity may be determined experimentally by (a) leading 780 nanometers wavelength light beams in the continuous (DC) mode from a semiconductor laser to a recording layer through a pickup with an aperture of NA 0.5, (b) irradiating the tracking-controlled phase-change recording media at various linear velocities with the light beams of a beam power ranging from 10 mW and 14 mW, and (c) measuring respective reflectivity values at either groove or land portions in irradiated disk areas.

Figure 2:
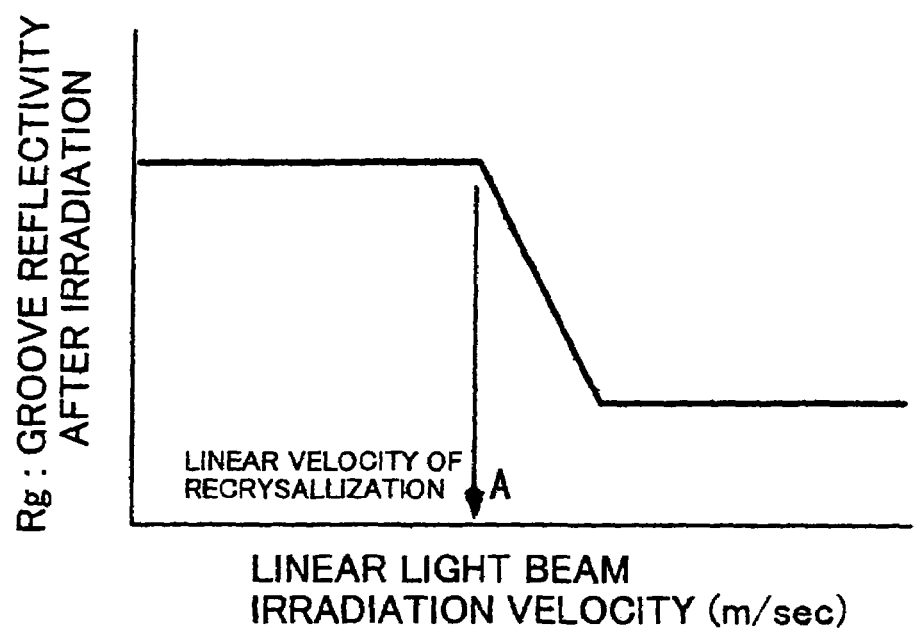
FIG. 2 is a graph of the groove reflectance as a function of linear velocity of laser beam irradiation on the optical recording medium disclosed herein.

The results obtained from the measurements are typically illustrated in FIG. 2, in which a recrystallization linear velocity is defined as the point 'A' on the horizontal axis, which approximately corresponds to the point dividing higher reflective values from lower ones on the graph. It may be noted that these higher and lower reflective values result from recrystallized and amorphous portions, respectively, on the irradiated disk area.

For the phase-change optical recording medium disclosed herein, the point A falls in the range between 5.0 meters/sec and 10.0 meters/sec. Accordingly, by controlling the recrystallization linear velocity into the above-mentioned 5.0-10.0 meters/sec range, the recording and erasure operations of the present recording medium become feasible at linear recording velocities higher than the quad-speed.

The magnitude of the recrystallization linear velocity is influenced primarily by the composition and thickness of, and the concentration of additives in the recording layer. The magnitude is also influenced by the thermal conductivity of the first dielectric layer, second dielectric layer, or reflective/heat dissipating (metal/alloy) layer. It is influenced further by substrate temperatures and sputtering conditions.

By rigorously examining the above noted parameters and their interrelation, the present inventors have clarified the determinants of the recrystallization linear velocity in terms of these parameters. As a result, it is found that, even when the above parameters do fluctuate, recording and erasure operations are feasible at an arbitrary linear recording velocity as long as the magnitude of the recrystallization linear velocity is controlled, thus leading to the present invention.

Accordingly, by controlling the recrystallization linear velocity to be in the range between 5.0 meters/sec and 10.0 meters/sec by adjusting various parameters for forming the present recording medium, the recording and erasure operations become feasible at linear recording velocities higher than the quad(CD4×)-speed, especially at the velocity ranging between 4.8 meters/sec and 11.2 meters/sec.

Moreover, appropriate disk characteristics of the phase-change recording medium are required not only for the feasibility of recording and erasure operations, as described earlier, but also for the stability in repeated operations, and the storage in various environments and/or for prolonged periods of time.

In order to satisfy the above requirements and simultaneously attain the recrystallization linear velocity ranging between 5.0 meters/sec and 10.0 meters/sec, it is also found that the recording layer in the phase-change optical recording medium include compositional elements such as Ag, In, Sb and Te, with a proportion in atom percent of $\alpha(Ag):\beta(In):\gamma(Sb):\delta(Te)$, with $0<\alpha\leqq10$, $2\leqq\beta\leqq12$, $55\leqq\gamma\leqq70$ and $22\leqq\delta\leqq32$, provided that $\alpha+\beta+\gamma+\delta=100$.

For the recording layer with the proportion of $10\leqq\alpha(Ag)$, $12\leqq\beta(In)$ and $70\leqq\gamma(Sb)$, the stability of readout signals and life of the recorded signals have been found unsatisfactory. In addition, it is also found that, because of its considerable influences upon the recrystallization linear velocity, the Te content in the recording layer preferably ranges between 22 atom % and 32 atom %, even after optimizing the thermal conductive properties of the recording layer in terms of the recording layer thickness and thermal conductivity values of other constituent layers.

As exemplified by the above described Te case, the disk characteristics are influenced in general by various parameters. In this context, although the recording layer composition may appear to be partially similar to those previously known, it should be noted that the composition presently disclosed can be attained only after carefully controlling those above noted various parameters such as, among others, the conditions of depositing the recording layer and the layer construction for forming the recording media.

Also found through examination by the present inventors is that, in order to improve the stability of readout signals and life of the recorded signals, it is effective for the recording layer to further incorporate at least one additive selected from the group consisting of the Group IIIB, IVB and VB elements.

The degradation of the stability of readout signals and life of the recorded signals are known to be caused by the crystallization of amorphous marks. This crystallization of amorphous marks is found to be adequately obviated by the above noted addition of at least one additive selected from the group consisting of the Group IIIB, IVB and VB elements.

Although details are yet to be clarified, this preventing effect is considered due to these additives which are incorporated either to be placed at interstitial sites in the AgInSbTe alloy, or to be formed as additional chemical bonds with the constituents of the alloy. This effect is therefore considered more pronounced with the additive which is smaller in its atomic radii, stronger in chemical force of binding with the AgInSbTe alloy, or larger in chemical bond order. In this context, the additive such as B, C, N, Si, Ge or Sn is more preferred for the preventing effect.

The amount of the additive in the recording layer is preferably about 5 atomic %. An amount higher than 5 atomic % adversely affects the inherent record/erase characteristics of the AgInSbTe system. This may result in leftover portions on the recording medium during erasing steps.

The incorporation of the additives may be carried out by, for example, admixing appropriate amounts of respective additives in a sputtering target prior to sputtering. For the N addition, its incorporation may be made by, for example, including gaseous N in the sputtering gas. In this case, an appropriate N content can be obtained by either admixing an adjusted amount of N into the sputter gas composition prior to the introduction into a sputtering chamber, or adjusting the proportion of respective incoming gaseous constituents such that an appropriate gaseous composition be achieved in the sputtering chamber.

The N species is preferably incorporated into the recording layer chemically bonded to at least one of Ag, In, Sb and Te. When the chemical bond is formed with Te, such as exemplified by, for example, Te—N and Sb—Te—N, pronounced effects can be obtained on the improvement in the number of repeated overwrite cycles.

Such chemical bonds as above may be analyzed by spectroscopic methods such as, for example, FT-IR and XPS. In the FT-IR spectra, for example, the Te—N bond yields an absorption peak in the range of 500-600 $cm^{-1}$ spectral range, while the Sb—Te—N exhibits an absorption peak in the 600-650 $cm^{-1}$ range.

The results on the composition of the recording layers disclosed herein have been obtained from the emission spectral analysis, while other methods may also be used for the analysis, such as x-ray microanalysis, Rutherford backscattering, Auger analysis, fluorescent x-ray spectroscopy and other similar methods. The results obtained from the latter methods may be used to compare with those from the emission spectral analysis. For the emission spectral analysis, its error of measurements is known in general to be within 5%. In addition, the secondary ion mass-spectroscopy may also be effectively used as another method for the analysis.

The structure of the materials in the recording layer may be examined by the x-ray or electron beam diffraction method. The crystalline state, for example, can be distinguished from the amorphous state using the electron beam diffraction method. That is, the presence of diffraction spots and/or Debye rings on diffraction patterns is generally taken to be indicative of the crystalline state, while halo rings is indicative of the amorphous state. In addition, the diameter of the crystallites may be calculated from the peak width at half maximum of the x-ray diffraction patterns according to the Scherrer's equation.

Further, spectral methods such as FT-IR and XPS are also effective for investigating binding states of other materials such as oxides and nitrides included in the recording medium.

The thickness of the recording layer preferably ranges from 10 nm to 50 nm, more preferably from 12 nm to 30 nm. When disk characteristics with respect to the initial jitter, overwrite and production yield are additionally considered, the recording layer preferably has a thickness ranging from 14 nm to 25 nm.

When the thickness thereof is smaller than 10 nm, the light absorbance by the layer decreases considerably. As a result, the layer cannot serve as a recording layer. In contrast, the thickness larger 50 nm causes a difficulty in attaining rapid and homogeneous phase change in the recording layer material.

The recording layer may be formed by various deposition methods such as, for example, vacuum evaporation, sputtering, plasma CVD, light assisted CVD, ion plating, or electron beam evaporation, or other similar methods. Of these, the sputtering method is preferably utilized for its excellent production yield and properties of the layers formed.

Examples of suitable materials for forming the first and second dielectric layers include metal oxides such as SiO, $SiO_2$, ZnO, $SnO_2$, $Al_2O_3$, $TiO_2$, $In_2O_3$, MgO and $ZrO_2$; nitrides such as $Si_3N_4$, AlN, TiN, BN and ZrN; sulfides such as ZnS, $In_2S_3$ and $TaS_4$; carbides such as SiC, TaC, $B_4C$, WC, TiC and ZrC; diamond-like carbon, and mixtures thereof.

These materials may be used individually or in combination. In addition, they may further include impurities, where relevant. While the dielectric layer may be formed to have a multilayered structure, their melting temperatures are preferably higher than that of the recording layer.

The first and second dielectric layers can be formed by, for example, vacuum evaporation, sputtering, plasma CVD, light assisted CVD, ion plating, or electron beam evaporation, or other similar methods. Of these, the sputtering method is preferably utilized for its excellent productivity and properties of those layers formed.

The thickness of the first dielectric layer influences considerably the reflectance of light beams readout at 650 nm from DVDs. In order to obtain reflectivity values between 0.15 and 0.25 at the wavelengths of 780 nm and 650 nm, which have been standardized for CD-RW disks, it is necessary for the first dielectric layer to have a thickness ranging from 65 nm to 130 nm.

The thickness of the second dielectric layer preferably ranges from 15 nm to 45 nm, more preferably from 20 nm to 40 nm. When the thickness thereof is smaller than 15 nm, the layer cannot serve as a heat resistant protective layer, while a thickness of larger than 45 nm causes several difficulties such as peeling-off at interlayer portions with relative ease and reducing the recording sensitivity in repeated recording operations.

As to the CD-RW disks, there have been strong demands recently for reducing disk costs. From the design point of view of the CD-RW disk, it has been considered effective for the cost reduction, to reduce the thickness of respective constituent layers, to make use of the sputtering target more efficiently, or to coincide the period of exchanging a plurality of the sputtering targets for forming respective constituent layers.

A conventional disk manufacturing apparatus often consists of six sputtering chambers at present. In order to attain as high a production yield as possible, the sheet type of sputtering apparatus is considered preferable, having six chambers: Two chambers used for forming the first dielectric layer, another chamber for the recording layer, still another chamber for the second dielectric layer, and the remaining two chambers for the metal/alloy layer.

That is, it is preferable for the first dielectric layer and recording layer to each be formed having a double-layer structure with this apparatus. Again, to attain the high yield indicated earlier, it is also preferable for a plurality of the sputtering targets to be replaced at the same time.

Therefore, it is preferable that the ratio, TL/UL, of the layer thickness of the second dielectric layer (TL) to that of the first dielectric layer thickness (UL) be approximately 0.5. However, this value should be examined further when various other characteristics are taken into consideration, of the recording medium disclosed herein. As a result, the above TL/UL ratio is preferably in the range of 0.4 and 0.6, as to make best use of the sputtering target and to thereby attain the high production yield in recording disk production.

To further pursue lower disk production costs, the reduction of thickness of the respective constituent layers is considered. For the present phase-change recording disks, in general, the first dielectric layer and the recording layer are thicker than other constituent layers. Therefore, it is another means for pursuing lower production costs to reduce the thickness of both first dielectric layer and recording layers.

As the material suitable for forming the first dielectric layer, the material ZnS-20 mol % $SiO_2$ is conventionally used for its excellent overall characteristics. The ZnS-20 mol % $SiO_2$ first dielectric layer is known, however, to yield insufficient signal intensities at the DVD readout wavelength, when its layer thickness is decreased, especially to a thickness of less than 65 nm.

From the view point of optical properties alone, the reduction in thickness of the first dielectric layer may be attained using a material having a higher dielectric constant, such as ZnS, for example, to thereby be able to obtain sufficient signal intensities at the DVD readout wavelength. However, this gives rise to several drawbacks such as, peeling off of the layers and/or mutual diffusion of constituent elements at the interfaces of the first dielectric layer between either the substrate or the AgInSbTe layer.

In order to obviate such drawbacks as described just above and to obtain sufficient signal intensities at the DVD readout wavelength even for thinner dielectric layers, the dielectric layer is currently formed to have a double-layer structure, including one layer with a higher dielectric constant and the other with lower dielectric constant. When the above-noted peeling is considered more important, the dielectric layer may be formed with two layers which are each formed with the conventional ZnS-20 mol % $SiO_2$ composition, being interposed by one ZnS layer.

Therefore, the phase-change optical recording medium disclosed herein has the sputtering layer structure formed on the substrate: Substrate/ZnS-20 mol % $SiO_2$ layer/ZnS layer (high dielectric constant)/ZnS-20 mol % $SiO_2$ layer/recording layer/second dielectric layer/metal or alloy layer. However, when layer deposition processes described earlier are considered, in which the second dialectic layer is formed using two sputtering chambers, the following two kinds of layer structures are preferred: One is substrate/ZnS-20 mol % $SiO_2$ layer/ZnS layer (high dielectric constant)/recording layer/second dielectric layer/metal or alloy layer, and the other is substrate/ZnS layer (high dielectric constant)/ZnS-20 mol % $SiO_2$ layer/recording layer/second dielectric layer/metal or alloy layer.

Suitable materials for use in the metal/alloy layer 5 include metals such as Al, Au, Ag, Cu, Ta, and alloys thereof. These metals may be added each with Cr, Ti, Si, Cu, Ag, Pd or Ta. The metal/alloy layer can be formed by, for example, vacuum evaporation, sputtering, plasma CVD, light assisted CVD, ion plating, electron beam evaporation, or other similar methods. The thickness of the metal/alloy layer preferably ranges from 70 nm to 200 nm, more preferably from 100 nm to 160 nm.

In order to decrease the metal/alloy layer thickness, to thereby attain lower production costs, a material for forming the layer preferably has a higher thermal conductivity, which is exemplified by, for example, Au, Ag, or the combination thereof.

Among these materials, Au is relatively expensive and unsuitable for the lower medium costs. In contrast, Ag or its alloy is quite suitable for its higher sputtering yield, to thereby be well employed in high tact layer forming processes. However, the Ag or its alloy layer is sulfurized with relatively ease when it is in contact with a sulfur containing layer such as the second dielectric layer in the present case. This difficulty can be effectively obviated by forming another metal or alloy layer between the Ag layer and the second dielectric layer.

The overcoating layer 6 is preferably provided on top of the metal/alloy layer 5 to serve as an oxidation inhibiting layer. This layer is generally formed with ultraviolet curing resinous materials which can be disposed by the spin coating method.

The thickness thereof preferably ranges from 5 µm to 15 µm. The layer thickness smaller than 5 µm may result in the increase of failures in affixing an overlying printed layer, while the thickness larger than 15 µm may cause the increase in the internal stress which considerably influences mechanical properties of the disks.

The hardcoat layer 6 is generally formed with ultraviolet curing resinous materials which may be disposed by the spin coating method.

The thickness thereof preferably ranges from 2 µm to 6 µm. The layer thickness smaller than 2 µm may result in an insufficient anti-scratching property of the layer surface, while the thickness larger than 6 µm may again cause the increase in the internal stress which considerably influences mechanical properties of the disks.

In addition, the hardcoat layer 6 preferably has a pencil hardness of at least 1H, which is sufficient to prevent scratches caused by, for example, wiping the layer surface with a cloth. Further, electrically conductive composition may be incorporated into the hardcoat layer, where relevant, to render antistatic and thus prevent dirt from sticking onto the layer surface.

Since the thickness of the foregoing sputtering formed overcoating and hardcoat layers influence the mechanical properties and warp of the recording disks, this entire disk thickness is preferably designed and fabricated to have a deviation of at most ±80 µm from one end product to another.

As electromagnetic radiation and energy beams useful for initializing, recording, reading out, or erasing the recording medium disclosed herein, laser light, electron beams, x-ray beams, ultraviolet light, visible light, infrared light or microwave radiation may be utilized. Of these radiation and beams, light beams from a semiconductor laser device are preferably used for its smallness in size and compactness of the source device.

For initializing recording media, focused intense laser beams are used in general having a relatively large beam diameter and the reflectance of the disk influences initialization procedures. That is, for the reflectance of less than 3%, the disk initialization cannot be achieved because of the difficulty in focusing the laser beams onto the disk. For the reflectance of larger than 11%, in contrast, other difficulties are encountered, in that the amplitude of readout signals from the phase-change recording disk cannot be obtained with a sufficient magnitude, and that a too high laser power is needed to achieve the initialization, to thereby result in an undue decrease in life of the laser diode device.

Since the uppermost re-crystallization linear velocity is designed for the recording disk disclosed herein to be between about 5.0 m/sec and 10.0 m/sec, an increased laser power may results in partial melting and thereby in undue amorphous state in the recording layer, when the disk is driven at the quad(CD8×)-speed (i.e., between 9.6 and 11.2 meters/sec).

When detailed recording process steps are examined by the present inventors to acquire a sufficient margin for the erasing steps at a linear velocity of equal to, or higher than the quad-speed, it is preferable the ratio, Pe8/Pw8, of erasing power (Pe8) to writing power (Pw8) for the octad-speed to be smaller than the ratio Pe4/Pw4 for the quad(CD4×)-speed.

Having generally described this invention, the following examples are provided further to illustrate preferred embodiments. This is intended to be illustrative but not to be limiting to the materials, processes or devices described herein.

EXAMPLES

Examples 1 Through 8

A phase-change recording medium was fabricated on a 1.2 millimeter thick polycarbonate substrate which was provided with pregrooved guide tracks of 0.5 micron width and 35 nanometers depth. The following constituent layers were formed consecutively on the substrate in the order recited in a single sheet-type sputtering apparatus with a seven seconds tact time. These constituent layers were a first dielectric layer, a recording layer, a second dielectric layer, and a reflective layer of metal or alloy. Thereafter, a hard coat layer and an overcoating layer were formed on the substrate and the reflective layer, respectively, using an ultraviolet curing resinous material disposed by spin coating, whereby a phase-change recording medium was fabricated. For forming the first and second dielectric layers, the combination of ZnS and $SiO_2$ was used; and for forming the reflective layer, an aluminum alloy was used.

In a similar manner, a plurality of the phase-change recording medium were further fabricated, in which constituent layers of each recording medium have different compositions as shown in Table 1. Subsequently, the recording layers in the recording media were each rendered to crystallization by means of an initialization apparatus equipped with a laser diode having a relatively large beam diameter.

The thus fabricated phase change recording media were each subjected to measurements for determining uppermost re-crystallization linear velocities and other media characteristics such as described hereinbelow, in which the measurements was carried out using a tester which was equipped with a pickup having an aperture of NA 0.5, under the 13 mW DC mode light beam irradiation of 780 nanometers in wavelength.

From the measurements of respective phase-change recording media of Examples 1 through 8, results on the disk characteristics were obtained. These results were the uppermost recrystallization linear velocity, reflectance prior to the initialization, jitter values in the CD(1×)-speed readouts after 1000 repeated over-write operations with the optimum laser power for quad(CD4×)-speed (4.8 meters/sec) and octad (CD8×)-speed (9.6 meters/sec) writings, and estimated storage life. These results are also shown in Table 1.

During the above measurements, writing steps were carried out in the manner specified by Orange Book III (version 1.0), in that the ratio, Pe4/Pw4, of erasing power (Pe4) to writing power (Pw4) for the quad-speed was adjusted to be 0.5, and that for the octad-speed, Pe8/Pw8, was also adjusted to be 0.5.

The results from the measurements indicate that the jitter values for the respective recording media of Examples 1 through 8 have been found equal to, or less than 35 ns, which is satisfactory compared with the value specified in the Orange Book. Further, the estimated storage life from the measurements was obtained to be equal to, or greater than 20 years.

Comparative Example 1

A further phase-change recording medium was fabricated in a manner similar to Example 1, with the exception that other compositions such as shown in Table 1 were used for forming the constituent layers. Subsequently, the thus fabricated phase change recording medium was subjected to the measurements for determining the disk characteristics described above.

In contrast to the recording media of the previous Examples, the results from the measurements indicate that the disk characteristics of the present recording medium are not satisfactory. Namely, the uppermost re-crystallization linear velocity was found as small as 4.1 m/sec, and the observed jitter was as high as 38 ns for the quad-speed overwriting. Moreover, for the octad-speed (9.6 meters/sec) writing, the jitter was not determined because of the failure in obtaining significant readout signals.

TABLE 1

| Example | First dielectric layer thickness (nm) | Recording layer thickness (nm) | Recording layer composition (at. %) | | | | Addition to recording layer | |
|---|---|---|---|---|---|---|---|---|
| | | | Ag | In | Sb | Te | Element | Amount (at. %) |
| 1 | 85 | 20 | 3 | 7 | 60 | 30 | none | 0 |
| 2 | 66 | 16 | 1 | 8 | 60 | 30 | none | 0 |
| 3 | 55 | 15 | 4 | 3 | 68 | 25 | none | 0 |
| 4 | 50 | 15 | 3 | 8 | 62 | 27 | none | 0 |
| 5 | 55 | 16 | 10 | 12 | 56 | 23 | none | 0 |
| 6 | 50 | 15 | 0.5 | 8 | 64 | 27 | Ge | 0.5 |
| 7 | 110 | 15 | 0.5 | 8 | 63 | 27 | N | 1.5 |
| 8 | 90 | 19 | 1 | 8 | 63 | 24 | C | 4.0 |
| Comparative Ex. 1 | 90 | 19 | 5 | 5 | 62 | 30 | none | 0 |

| Example | Second dielectric layer thickness (nm) | Metal/alloy layer thickness (nm) | Reflectivity before initialization (%) | Re-crystallization linear velocity (ns) | Quad-speed 3T jitter (ns) 1) | Octad-speed 3T jitter (ns) 2) | Storage life (year) |
|---|---|---|---|---|---|---|---|
| 1 | 30 | 150 | 4.5 | 5.2 | 29 | 34 | 100 |
| 2 | 27 | 130 | 4.0 | 6.1 | 32 | 34 | 100 |
| 3 | 27 | 125 | 4.0 | 7.4 | 30 | 30 | 20 |
| 4 | 25 | 140 | 4.3 | 7.4 | 30 | 30 | 80 |
| 5 | 27 | 125 | 4.0 | 8.8 | 34 | 31 | 40 |
| 6 | 25 | 120 | 4.8 | 8.2 | 32 | 31 | 90 |
| 7 | 31 | 150 | 4.0 | 7.4 | 30 | 30 | 90 |
| 8 | 31 | 150 | 3.8 | 9.9 | 35 | 30 | 70 |
| Comparative Ex. 1 | 30 | 150 | 4.7 | 4.1 | 38 | Not determined | 70 |

Example 9

A phase-change recording medium was fabricated in a manner similar to Example 4, with the exception that the first dielectric layer was formed with two constituent layer such as a ZnS—SiO$_2$ (20 mol. %) layer 20 nm thick and another ZnS—SiO$_2$ (10 mol. %) layer formed further thereon. Subsequently, the thus fabricated phase change recording medium was subjected to the measurements for determining disk characteristics described above.

The results from the measurements indicate that the uppermost recrystallization linear velocity was found as 7.7 m/sec, and the observed overwrite characteristics were comparable with those of the recording medium of Example 4. In addition, both the reflectance and signal amplitude were increased with respect to readout signals at 650 nm DVD wavelength.

Example 10

A phase-change recording medium was fabricated in a manner similar to Example 8, with the exception that an aluminum alloy layer 20 nm thick was formed on the second dielectric layer with a silver layer 50 nm formed further thereon.

The thus fabricated phase change recording medium was subsequently subjected to the measurements for determining disk characteristics described above.

The results from the measurements indicate that the uppermost recrystallization linear velocity was found as 7.7 m/sec, and the observed overwrite characteristics were comparable with those of the recording medium of Example 8. In addition, both the reflectance and signal amplitude were found satisfactory with respect to readout signals at 650 nm DVD wavelength.

Further, since the overall thickness of the alloy and metal layers was decreased, a larger sputtering rate was able to be employed. As a result, the consecutive formation with a six-second tact time of the constituent layers has become feasible, thereby reducing the production costs of the recording medium.

Example 11

The plurality of phase-change recording media fabricated in Examples 1 through 4 were subjected to the measurements for determining disk characteristics under the conditions of the aforementioned ratio Pe4/Pw4 of 0.5 for the quad-CD speed writing and the ratio Pe8/Pw8 of 0.46 for octad-CD speed writing. The results from the measurements indicate that the jitter values were reduced after octad-speed overwrite operations with the respective phase-change recording media.

It is apparent from the above description including the examples, by forming the phase change optical recording medium disclosed herein to have an uppermost recrystallization linear velocity for its recording layer ranging from about 5.0 m/sec to about 10.0 m/sec, write/erase operations become feasible for the recording medium at linear velocities higher than the quad-speed, for example, at the octad(CD8×)-speed ranging from 9.6 meters/sec and 11.2 meters/sec.

This uppermost recrystallization linear velocity are accomplished by the AgInSbTe alloy with several additives, where relevant, having compositions specified in the present disclosure.

Also with these alloy compositions, excellent recording disk characteristics are achieved not only for the write/erase operations but also for the overwrite capability as well as the stability of readout signals and life of the recorded signals.

In addition, production costs can be reduced with the present construction of the recording medium, in which the thinner dielectric layers as well as recording layer can be formed retaining sufficient signal intensities at the DVD readout wavelength, yet realizing high tact time for the disk production.

The process steps set forth in the present description on the constituent layer deposition may be implemented using a conventional general purpose microprocessors, programmed according to the teachings in the present specification, as will be appreciated to those skilled in the relevant arts. Appropriate software coding can readily be prepared by skilled programmers based on the teachings of the present disclosure, as will also be apparent to those skilled in the relevant arts.

The present invention thus include also a computer-based product which may be hosted on a storage medium, and include instructions which can be used to program a microprocessor to perform a process in accordance with the present disclosure. This storage medium can include, but not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Numerous additional modifications and variations of the embodiments described above are possible in light of the above teachings. It is therefore to be understood that within the scope of the appended claims, the present invention may be practiced otherwise than as specifically described herein.

This document claims priority and contains subject matter related to Japanese Patent Application No. 11-153486, filed with the Japanese Patent Office on Jun. 1, 1999, the entire contents of which are hereby incorporated by reference.

What is claimed as new and desired to be secured by Letters Patent of the United States is:

1. A phase-change optical recording medium comprising:
a supporting substrate, and
the following contiguous layers formed on said supporting substrate in the order recited, such as a first dielectric layer, a phase change recording layer, a second dielectric layer, a metal/alloy layer, and an ultraviolet light cured resinous layer; said phase change recording layer essentially consisting of Ag, In, Sb, Te and at least one additive selected from the group consisting of B, C, N, Si, Ge and Sn, with a proportion in atom percent of $\alpha$(Ag):$\beta$(In):$\gamma$(Sb):$\delta$(Te):$\theta$(additive), with $0<\alpha\leq10$, $2\leq\beta\leq12$, $55\leq\gamma\leq70$, $22\leq\delta\leq32$, and $0<\theta\leq5$, provided that $\alpha+\beta+\gamma+\delta+\theta=100$,
wherein an uppermost recrystallization linear velocity of said phase change recording layer is from about 7.4 m/sec to about 10.0 m/sec;
wherein the uppermost recrystallization linear velocity is determined by applying a DC mode laser beam having a 780 nanometer wavelength and a beam power ranging from 10 mW to 14 mW, to the recording medium, and measuring reflectivity values at groove or land portions in irradiated disk areas, through a pickup with an aperture of NA 0.5;
wherein the substrate has a thickness of approximately 1.2 mm;
wherein a thickness of the first dielectric layer is in a range from 65 nm to 130 nm, and said medium has a reflectivity of not less than 15% at each of wavelengths of 780 nm and 650 nm; and
wherein jitter at a linear recording speed of higher than (CD4××)-speed is less than 35 ns.

2. The phase-change optical recording medium according to claim 1, wherein:
said first dielectric layer is composed of at least two constituent layers, and wherein:
a ratio of thickness of said first to said second dielectric layer being from about 0.4 to about 0.6.

3. The phase-change optical recording medium according to claim 1, wherein:
said metal/alloy layer is composed of at least two constituent layers.

4. The phase-change optical recording medium according to claim 1, wherein:
reflectance at 780 nm in wavelength of said recording medium prior to initialization and non-initialized portions of said recording medium is from about 3% to about 11%.

5. The phase-change optical recording medium according to claim 1, wherein:
a ratio Pe8/Pw8 of erasing power Pe8 to writing power Pw8 for an octad(CD8×)-speed is smaller than a ratio Pe4/Pw4 for a quad(CD4×)-speed.

6. A phase-change optical recording medium comprising a substrate and the following layers overlying the substrate in the order recited: a first dielectric layer, a recording layer, a second dielectric layer, a metal or metal alloy layer and an ultraviolet crosslinked layer,
wherein an upper limit of speed of recrystallization of the optical recording medium is in a range from 7.4 m/sec to 10.0 m/sec, and the optical recording medium performs recording and erasing at a linear velocity of from 4.8 m/sec to 11.2 m/sec;
wherein said upper limit of speed of recrystallization is determined by applying a DC mode laser beam having a 780 nanometer wavelength and a beam power ranging from 10 mW to 14 mW, to the recording medium, and measuring reflectivity values at groove or land portions in irradiated disk areas, through a pickup with an aperture of NA 0.5;
wherein the substrate has a thickness of approximately 1.2 mm;
wherein a thickness of the first dielectric layer is in a range from 65 nm to 130 nm, and said medium has a reflectivity of not less than 15% at each of wavelengths of 780 nm and 650 nm; and
wherein jitter at a linear recording speed of higher than (CD4×)-speed is less than 35 ns.

7. A phase-change optical recording medium comprising:
a substrate and the following layers overlying the substrate in the order recited: a first dielectric layer, a phase change recording layer, a second dielectric layer, a metal/alloy layer, and an ultraviolet light cured resinous layer, wherein the phase change recording layer essentially consists of Ag, In, Sb, Te and at least one additive selected from the group consisting of the Group IIIB, IVB, and VB elements, with a proportion in atom percent of $\alpha(Ag):\beta(In):\gamma(Sb):\delta(Te):\theta(additive)$, with $0<\alpha\leq10$, $2\leq\beta\leq12$, $55\leq\gamma\leq70$, $22\leq\delta\leq32$, and $0<\theta\leq5$, provided that $\alpha+\beta+\gamma+\delta+\theta=100$, and
wherein an uppermost recrystallization linear velocity of said phase change recording layer is from about 7.4 m/sec to about 10.0 m/sec;
wherein the uppermost recrystallization linear velocity is determined by applying a DC mode laser beam having a 780 nanometer wavelength and a beam power ranging from 10 mW to 14 mW, to the recording medium, and measuring reflectivity values at groove or land portions in irradiated disk areas, through a pickup with an aperture of NA 0.5;
wherein the substrate has a thickness of approximately 1.2 mm;
wherein a thickness of the first dielectric layer is in a range from 65 nm to 130 nm, and said medium has a reflectivity of not less than 15% at each of wavelengths of 780 nm and 650 nm; and
wherein jitter at a linear recording speed of higher than (CD4×)-speed is less than 35 ns.

8. The phase-change optical recording medium according to claim 7, wherein reflectance at 780 nm in wavelength of said recording medium prior to initialization and non-initialized portions of said recording medium, is from about 3% to about 11%.

9. The phase-change optical recording medium according to claim 7, wherein a ratio Pe8/Pw8 of erasing power Pe8 to writing power Pw8 for an octad(CD8×)-speed is smaller than ratio Pe4/Pw4 for a quad(CD4×)-speed.

10. The phase-change optical recording medium according to claim 7, wherein said at least one additive is selected from the group consisting of B, C, N, Si, Ge and Sn.

11. The phase-change optical recording medium according to claim 7, wherein said first dielectric layer is composed of at least two constituent layers.

12. The phase-change optical recording medium according to claim 7, wherein said metal/alloy layer is composed of at least two constituent layers.

13. The phase-change optical recording medium according to claim 7, wherein a ratio of thickness of said first to said second dielectric layer is from about 0.4 to about 0.6.

14. The phase-change optical recording medium according to claim 7, wherein a thickness of the recording layer is within a range, inclusive, of 15 nm to 20 nm.

15. The phase-change optical recording medium according to claim 7, wherein said at least one additive is C, $\alpha=1$, $\beta=8$, $\gamma=63$, $\delta=24$, and $\theta=4$.

16. The phase-change optical recording medium according to claim 7, wherein said at least one additive is Ge, $\alpha=0.5$, $\beta=8$, $\gamma=64$, $\delta=27$, and $\theta=0.5$.

17. The phase-change optical recording medium according to claim 7, wherein said at least one additive is one of C, N and Ge, $0<\alpha\leq1$, $\beta=8$, $63\leq\gamma\leq64$, $24\leq\delta\leq27$, and $0.0<\theta\leq4$.

18. A phase-change optical recording medium comprising:
a substrate and the following layers overlying the substrate in the order recited: a first dielectric layer, a phase change recording layer, a second dielectric layer, a metal/alloy layer, and an ultraviolet light cured resinous layer, wherein the phase change recording layer essentially consists of Ag, In, Sb, and Te, with a proportion in atom percent of $\alpha(Ag):\beta(In):\gamma(Sb):\delta(Te)$, with $0<\alpha\leq10$, $2\leq\beta\leq12$, $55\leq\gamma\leq70$, and $22\leq\delta\leq32$, provided that $\alpha+\beta+\gamma+\delta=100$, and
wherein an uppermost recrystallization linear velocity of said phase change recording layer is from about 7.4 m/sec to about 10.0 m/sec;
wherein the uppermost recrystallization linear velocity is determined by applying a DC mode laser beam having a 780 nanometer wavelength and a beam power ranging from 10 mW to 14 mW, to the recording medium, and measuring reflectivity values at groove or land portions in irradiated disk areas, through a pickup with an aperture of NA 0.5;
wherein the substrate has a thickness of approximately 1.2 mm;

wherein a thickness of the first dielectric layer is in a range from 65 nm to 130 nm, and said medium has a reflectivity of not less than 15% at each of wavelengths of 780 nm and 650 nm; and wherein jitter at a linear recording speed of higher than (CD4×)-speed is less than 35 ns.

19. The phase-change optical recording medium according to claim 18, wherein $\alpha=10$, $\beta=12$, $\gamma=56$ and $\delta=23$.

20. The phase-change optical recording medium according to claim 18, wherein $\alpha=3$, $\beta=8$, $\gamma=62$ and $\delta=27$.

21. The phase-change optical recording medium according to claim 18, wherein $1\leq\alpha\leq4$, $3\leq\beta\leq8$, $60\leq\gamma\leq68$, and $25\leq\delta\leq30$.

22. The phase-change optical recording medium according to claim 18, wherein reflectance at 780 nm in wavelength of said recording medium prior to initialization and non-initialized portions of said recording medium, is from about 3% to about 11%.

23. The phase-change optical recording medium according to claim 18, wherein a ratio Pe8/Pw8 of erasing power Pe8 to writing power Pw8 for an octad(CD8×)-speed is smaller than ratio Pe4/Pw4 for a quad(CD4×)-speed.

24. The phase-change optical recording medium according to claim 18, wherein said first dielectric layer is composed of at least two constituent layers.

25. The phase-change optical recording medium according to claim 18, wherein said metal/alloy layer is composed of at least two constituent layers.

26. The phase-change optical recording medium according to claim 18, wherein a ratio of thickness of said first to said second dielectric layer is from about 0.4 to about 0.6.

27. The phase-change optical recording medium according to claim 18, wherein a thickness of the recording layer is within a range, inclusive, of 15 nm to 20 nm.

28. A phase-change optical recording medium comprising: a supporting substrate, and the following contiguous layers formed on said supporting substrate in the order recited, such as a first dielectric layer, a phase change recording layer, a second dielectric layer, a metal/alloy layer, and an ultraviolet light cured resinous layer; said phase change recording layer essentially consisting of Ag, In, Sb, Te and at least one additive selected from the group consisting of B, C, N, Si, Ge and Sn, with a proportion in atom percent of $\alpha(Ag):\beta(In):\gamma(Sb):\delta(Te):\theta(additive)$, with $0<\alpha\leq10$, $2\leq\beta\leq12$, $55\leq\gamma\leq70$, $22\leq\delta\leq32$, and $0<\theta\leq5$, provided that $\alpha+\beta+\gamma+\theta=100$, wherein an uppermost recrystallization linear velocity of said phase change recording layer is from about 7.4 m/sec to about 10.0 m/sec;

wherein the uppermost recrystallization linear velocity is determined by applying a DC mode laser beam having a 780 nanometer wavelength and a beam power ranging from 10 mW to 14 mW, to the recording medium, and measuring reflectivity values at groove or land portions in irradiated disk areas, through a pickup with an aperture of NA 0.5;

wherein the substrate has a thickness of approximately 1.2 mm;

wherein a thickness of the first dielectric layer is in a range from 65 nm to 130 nm, and said medium has a reflectivity of not less than 15% at each of wavelengths of 780 nm and 650 nm; and wherein a thickness of the recording layer is no more than 19 nm;

wherein jitter at a linear recording speed of higher than (CD4×)-speed is less than 35 ns.

29. The phase-change optical recording medium of claim 28, wherein said thickness of the recording layer is in a range of 15 nm through 19 nm, inclusive.

\* \* \* \* \*